United States Patent Office 2,810,628
Patented Oct. 22, 1957

2,810,628
METHOD OF PREPARING CYCLIC POLYSILOXANES FROM DICHLOROSILANE

Donald L. Bailey, Snyder, and Edward R. York, Endwell, N. Y., assignors to Union Carbide Corporation, a corporation of New York No Drawing. Application March 21, 1955, Serial No. 495,773

3 Claims. (Cl. 23—203)

This invention relates to novel cyclic polysiloxanes derived from dichlorosilane and a method for preparing the same. More particularly the invention is concerned with novel compositions of matter prepared by the hydrolysis of dichlorosilane ($H_2SiCl_2$) to cyclic tetramers, pentamers and hexamers. The resulting materials may be advantageously employed in the preparation of linear polysiloxanes, useful as coating agents, water repellants and the like, by the simple technique of polymerization or equilibration.

Briefly stated, the cyclic compounds of the present invention may be prepared by the hydrolysis in a hydrocarbon and ether solution, e. g., a mixture of pentane and diethyl ether, of dichlorosilane at about ice temperature or below and up to about room temperature, i. e. about 25° C. The cyclic materials prepared from such hydrolysis are principally the cyclic tetramers, pentamers and hexamers which are non-viscous liquids. The tetramer is the most stable with respect to depolymerization, the pentamer is less stable than the tetramer, and the hexamer is somewhat less stable than the other two. Some higher boiling cyclic polysiloxanes are also produced in such a hydrolysis but when the conditions are properly selected and the correct solvent employed in accordance herewith, such higher molecular weight materials are in the minority and are readily depolymerized, generally decomposing to the tetramer at temperatures above about 125° C. The pentamer and hexamer likewise will be expected in large measure to decompose to the tetramer at temperatures above about 125° C. At room temperature and substantially above, however, all three of the principal cyclic materials are thermally stable.

Efforts to prepare cyclic polysiloxanes from dichlorosilane by hydrolysis in a dilute aqueous ether solution have been found to result in a rather non-volatile oil which appears to be essentially linear polysiloxanes; hydrolysis in a pentane solution, on the other hand, resulted principally in a gel and very little distillable material capable of yielding cyclic materials herein described and claimed.

The preferred reaction temperature is about 0° C. and may be obtained by direct contact with ice, by the controlled evolution of hydrogen chloride from the reaction mixture or any other suitable means, e. g., pre-cooling the reactants to about dry ice temperature and conducting the reaction without further cooling.

It has been found in accordance herewith that a 70 to 30 wt. percent mixture of pentane and diethylether respectively, results in the highest production of the cyclic polymers stable at room temperatures, i. e., the tetramer, pentamer and hexamer. Other ratios of such solvents may be employed but mixtures of hydrocarbon and ether containing at least about 20% hydrocarbon and no more than about 85% of the hydrocarbon appear to be essential to the preparation of the three desired cyclic materials in predominant quantities. It should be understood that other saturated hydrocarbons as well as a variety of ethers may be employed; thus, for example, the various other paraffinic hydrocarbons related to pentane such as hexane, heptane, etc., or the aromatics such as benzene and toluene may be employed in conjunction with ethers such as ethyl ether, isopropyl ether, butyl ether, etc. The essential requirement for such a solvent or solvent mixture is that it have some limited solubility for water and only very limited affinity for hydrogen chloride. If the solvent does not dissolve in water, the rate of hydrolysis is too slow; if affinity for hydrogen chloride is too high, too large a concentration of hydrogen chloride builds up in the solvent and destroys the polymer by reaction with Si—H bonds. Because the product decomposes under basic conditions it is necessary to maintain a mildly acid solution during the hydrolysis and any subsequent distillation or purification.

Having thus described the general conditions and the solvents suitable for use in the preparation of cyclic polysiloxanes from dichlorosilane, there is set forth below for purposes of illustration and not of limitation a specific example of the manner in which the cyclic materials may be prepared.

Example

A cold solution of 247 grams (2.46 mols) of purified dichlorosilane in 1,000 cc. of a 70 to 30 percent mixture by volume of pentane and diethyl ether, respectively, was poured onto a mixture of cracked ice and 1500 cc. of the ether-pentane mixture. The cold hydrolysis products were processed rapidly by first washing the resulting solvent solution of dihydrogen siloxanes to near neutrality as indicated by pH paper. The then slightly acid hydrolyzate solution was dried over anhydrous $CaCl_2$ for 1 hour, filtered, desolvated and stripped to a kettle temperature of 135° C. at 1 mm. There was collected 19.7 grams of volatiles in a receiver and 17 grams of non-volatiles remained in the flask. The volatiles in the receiver were combined with the ether-pentane fraction in the cold trap and the entire solution distilled at atmospheric pressure in a nitrogen atmosphere. After the ether and pentane were distilled off there was obtained fractions boiling at 76° to 78° C. and also at 106° to 108° C. These two fractions were later identified and characterized as the dihydrogen cyclic tetramer and the dihydrogen cyclic pentamer respectively. Set forth below are the physical properties of the tetramer and pentamer so produced:

|  | Boiling Point (° C.) | $N_D^{25}$ | Molecular Weight | | Silanic Hydrogen, cc./g. | |
|---|---|---|---|---|---|---|
|  |  |  | Found | Theory | Found | Theory |
| $[H_2SiO]_4$ | 76–78 | 1.3827 | 183 | 184 | 970 | 974 |
| $[H_2SiO]_5$ | 106–108 | 1.3891 | 225 | 230 | 955 | 974 |

In later experiments the dihydrogen cyclic hexamer was isolated in a similar manner. Because the hexamer was subject to decomposition if distilled from the reaction mixture at atmospheric pressure it was isolated at a temperature of 42° to 43° C. at a pressure of 15 mm. of mercury. The hexamer had a refractive index of 1.3910, a molecular weight of 268 as compared to the theoretical of 276 and a silanic hydrogen content of 988 as compared to the theoretical of 974 cc./g.

It should be understood that since it is necessary to distill the cyclic polymers from the solvent medium, the solvents employed in the hydrolysis of dichlorosilane to the cyclic materials should have boiling points substantially below or above that of any or all of the desired polymer in order to permit easy separation. For example, in isolating by distillation from the reaction mass the tetramer which has a boiling range of from about 76° to 78° C., it will be apparent to one skilled in the art that a solvent boiling substantially apart from that temperature would be required in order to assure clean separation of solvent from tetramer. The proper selection of solvents is readily made.

An outstanding utility of the novel cyclic materials produced in accordance with the present invention is their use in the production of linear polysiloxanes of the type useful in the water repellant field by equilibration, either alone or in conjunction with other cyclic polysiloxanes such as the cyclic dimethyltetramer. Thus, beginning with the known cyclic material free of any tri-functional impurities, it is possible to prepare a linear material free of these undesired ingredients where such preparation is difficult if not impossible when beginning with the respective chlorosilane or mixtures thereof which almost always have at least a trace of the tri-functional methyltrichlorosilane present. Thus, for example, a mixture of 8 grams (0.17 mol.) of dihydrogencyclicpentamer, 38 grams (0.51 mol.) of dimethylcyclictetramer, i. e. prepared from dimethyldichlorosilane, 0.81 gram (0.005 mol.) of hexamethyldisiloxane and 0.46 gram (1 wt. percent) of concentrated sulphuric acid was agitated for 5 hours. Thereafter the reaction mixture was shaken with water to deactivate the catalyst following which the addition of isopropyl ether and subsequent neutralization of the ether solution with dilute aqueous bicarbonate was carried out. The solution was then stripped to a kettle temperature of 150° C. at 1 mm. Hg. There was obtained a copolymer with a viscosity of 24 cstks. at 25° C. which contained 177 cc. per gram of hydrolyzable hydrogen (theory=167 cc. gram). This copolymer was found to be useful as a textile water repellent.

An additional use of the cyclic polymers prepared in accordance herewith is in surface coating silica gel. The resulting materials thus coated with a polysiloxane film are valuable in the preparation of greases and for other purposes apparent to one skilled in the art.

Having thus described our invention, what we claim as novel and desire to protect by Letters Patent is as follows:

1. The method of preparing cyclic polysiloxanes having the general formula:

$$[H_2SiO]_m$$

wherein $m$ is a positive integer from 4 to 6 inclusive, which method comprises hydrolyzing dichlorosilane at a temperature below about 25° C. in a solvent comprising from about 20% to about 85% of a saturated hydrocarbon containing from about 5 to about 10 carbon atoms and the remainder an aliphatic ether containing fewer than about 12 carbon atoms.

2. The method of preparing cyclic polysiloxanes having the general formula:

$$[H_2SiO]_m$$

wherein $m$ is a positive integer from 4 to 6 inclusive, which method comprises hydrolyzing dichlorosilane at a temperature below about 25° C. in a solvent comprising from about 70% of a saturated hydrocarbon containing from about 5 to about 10 carbon atoms and the remainder an aliphatic ether containing fewer than about 12 carbon atoms.

3. The method of claim 1 wherein the saturated hydrocarbon is pentane and the ether is diethylether.

References Cited in the file of this patent

UNITED STATES PATENTS

| | | |
|---|---|---|
| 2,547,678 | Wilcock et al. | Apr. 3, 1951 |
| 2,551,571 | Culbertson | May 8, 1951 |
| 2,676,091 | Barry et al. | Apr. 20, 1954 |